LINE RELAY FOR D.C. TELEGRAPH SYSTEMS
Filed Jan. 10, 1968
Fig.1
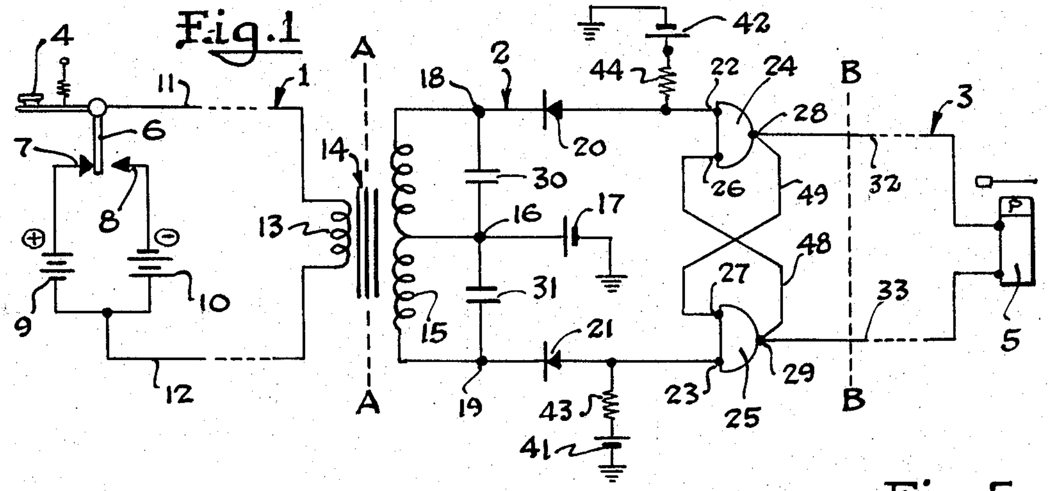
Fig.2
| 23 | 27 | 29 |
|---|---|---|
| 0 | 0 | + |
| + | 0 | + |
| 0 | + | + |
| + | + | 0 |
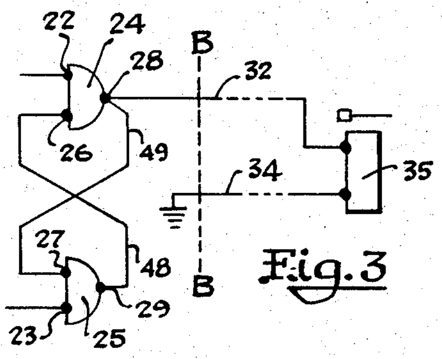
Fig.3
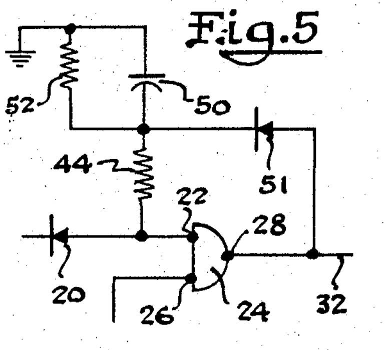
Fig.5
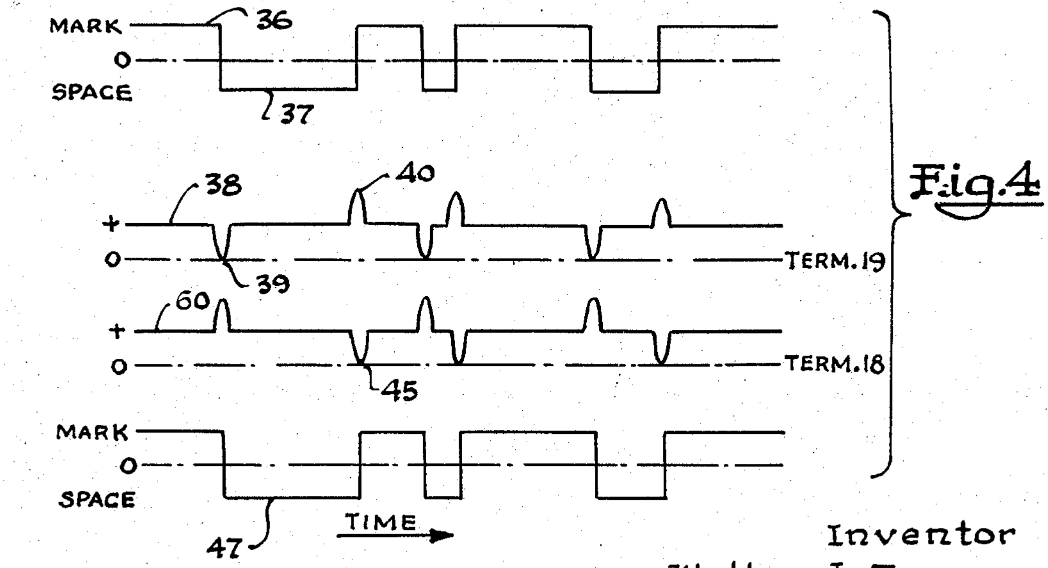
Fig.4
Inventor
Walter J. Zenner
By Wallace, Kinzer & Dorn
Attorneys

1

3,476,879
LINE RELAY FOR D.C. TELEGRAPH SYSTEMS
Walter J. Zenner, 1776 Sherwood Road,
Des Plaines, Ill. 60016
Filed Jan. 10, 1968, Ser. No. 696,912
Int. Cl. H04l 25/24
U.S. Cl. 178—70 5 Claims

ABSTRACT OF THE DISCLOSURE

A line relay for a D.C. telegraph system in which coupling from the transmitter side of the system to the receiver side is effected through a conventional A.C. transformer, the original D.C. telegraph signal impulses being reproduced in the receiving circuit by means of a flip-flop circuit afforded by two cross-connected NAND circuits each having an input connected to one terminal of the transformer secondary.

Background of the invention

This invention relates to direct current telegraph systems and more specifically to line relays for repeating the direct current telegraph signal impulses in the course of transmission. Repeater relays and amplifiers have long been known in the art. They constitute one of the prime sources of maintenance difficulties and of both original and continuing cost in the operation of any direct current telegraph system required to operate over substantial distances.

Summary of the invention

It is an object of the present invention to provide a telegraph signal repeating relay that is highly stable and reliable in operation and that repeats a received D.C. telegraph signal with maximum accuracy and minimum direction.

A further object of the invention is to provide a telegraph signal repeating relay that affords complete and dependable electrical isolation between the input or transmitter circuit and the output or receiver circuit of a telegraph system.

A principal feature of the invention is the use of a conventional transformer to couple an incoming circuit to an outgoing circuit in a D.C. telegraph system. The transformer is supplemented by a simple electronic circuit that permits the basic alternating current device, the transformer, to be used effectively in a D.C. system. In the preferred form, this electronic circuit comprises a pair of NAND circuit cross-connected to afford a flip-flop circuit, with steady state bias applied to the main input of each of the NOR circuits.

Other and further objects of the present invention will be apparent from the following description and claims and are illustrated in the accompanying drawings which, by way of illustration, show preferred embodiments of the present invention and the principles thereof and what is now considered to be best mode contemplated for applying these principles.

Brief description of the drawings

FIG. 1 is a schematic diagram showing a line relay constructed in accordance with one embodiment of the invention, connected in a typical direct current telegraph signalling circuit;

FIG. 2 is a truth table or polarity diagram for a gate circuit used in the relay;

FIG. 3 is a schematic diagram showing an alternate form of outgoing circuit;

FIG. 4 is a diagram showing current and voltage wave forms at several points in the system; and

2

FIG. 5 is a schematic diagram showing an alternate bias circuit used in the relay.

Description of the preferred embodiments

As shown in FIG. 1, the operating system comprises three principal divisions, an incoming telegraph circuit 1, a relay circuit 2, and an outgoing telegraph circuit 3. The two dotted lines A—A and B—B are the boundary lines for these divisions.

The telegraph circuits 1 and 3 may include any type of direct current telegraph apparatus. An elementary system using a manual key 4 as a sender and a polarized sounder magnet 5 as a receiver is shown in FIG. 1 solely for simplicity; more complex telegraph instruments can be used as desired. The manual key 4 has an electrical switch tongue 6 which is normally in contact with a switch point 7. A battery 9 supplies line current through switch point 7 to tongue 6 and over a conductor 11 to the primary winding 13 of a transformer 14. A conductor 12 provides a return path to battery 9. When key 4 is manually depressed, tongue 6 moves from point 7 to point 8. A battery 10 supplies reverse-polarity line current through switch point 8, tongue 6 and conductor 11 to the primary winding 13 of transformer 14, and return conductor 12.

The secondary winding 15 of transformer 14 has a center point 16 which is connected to a battery 17. Battery 17 is a positive bias voltage source which establishes a preferred steady state potential for the secondary winding 15 with respect to ground. The end terminals 18 and 19 of secondary winding 15 connect to input terminals 22 and 23 of two gate circuits 24 and 25 through two diodes 20 and 21, respectively. A second input terminal 26 of gate 24 is connected to the output terminal 29 of gate 25, and a second input terminal 27 of gate 25 is connected to the output terminal 28 of gate 24.

Gates 24 and 25 are conventional NAND gates, considered from the viewpoint of positive logic (NOR gates in negative logic) and may be integrated circuit modules or even a single module such as are well known in the art. Associated wth gates 24 and 25 is a conventional power supply, not shown.

A biasing battery 42 normally holds input terminal 22 of gate 24 at a positive potential and a biasing battery 41 normally holds input 23 of gate 25 at a positive potential. Two capacitors 30 and 31 are connected from terminals 18 and 19, respectively, to center terminal 16 on transformer secondary 15, to suppress electrical noise.

An outgoing line 32 connects the output terminal 28 of gate 24 to the coil of the sounder magnet 5. A conductor 33 provides a return path from magnet 5 to the output terminal 29 of gate 25. Magnet 5 is a conventional representation of the output load, which may in fact be any well known direct current operated telegraph line terminal apparatus, with any suitable amplifier or other input device as required. FIG. 3 illustrates an alternate form of sounder magnet 35 of the neutral or nonpolarized type. The return conductor 34 for sounder magnet 35 is connected to ground in the relay circuit.

FIG. 5 shows an alternate bias circuit for gate 24 in which a charged capacitor 50 is substituted for the battery 42 used in the circuit of FIG. 1. A diode 51 supplies charging current to the capacitor from terminal 28. A resistor 52 is connected across capacitor 50.

In the normal idle state of the circuit, FIG. 1, current flows from battery 9 through contact 7 and tongue 6 over the telegraph line conductors 11 and 12 to the distant transformer primary winding 13. This direction of current flow may be called the *marking* state. When key 4 is depressed, tongue 6 leaves contact 7 and touches contact 8. Battery 10 is connected with its polarity reversed with respect to battery 9. Current flows over the telegraph line 11, 12 to the distant primary transformer winding 13. This direction of the current flow is opposite to that of the marking state and is called the *spacing* state.

In FIG. 4, the signal trace 36 represents the marking state and the trace 37 represents the spacing state. The state reverses, as shown, when key 4 is repeatedly operated for signalling purposes.

When steady unchanging current flows through the transformer primary winding 13, no voltage is induced in the secondary winding 15. During the transition period when the current state is changing in primary winding 13, a momentary voltage is induced in the secondary winding 15. Trace 38 shows this induced voltage as observed between the end 19 of the secondary winding and ground. Terminal 19 is normally held positive with respect to ground by bias battery 17. When the current in the primary winding 13 changes from mark to space, the induced voltage in the secondary winding 15 causes the voltage at terminal 19 to go toward zero, and preferably to just reach zero as shown at point 39, FIG. 4. When the state of the current in primary winding 13 changes from space to mark, the voltage induced in the secondary winding 15 causes the voltage at terminal 19 to momentarily go in the plus direction, away from zero, as shown at point 40 in FIG. 4. These momentary pulses continue to be generated as reversals of the current through primary winding 13 continue to occur.

The secondary winding terminal 18 is biased in the same manner as terminal 19 and has similar momentary induced voltages impressed upon it, except that the polarity or direction of these induced voltages is opposite to those for terminal 19. Trace 60 in FIG. 4 shows the normal steady state voltage for terminal 18 with respect to ground and also shows the impressed momentary voltages.

The voltage at input terminal 23 of gate 25 is normally positive, held at this level by a bias battery 41, through resistor 43. When the voltage at terminal 19 momentarily goes to zero, the voltage at terminal 23 is also pulled to zero. Diode 21 is biased in the direction which permits this action. When the voltage at terminal 19 goes positive momentarily as shown at point 40 in FIG. 4, this increase in voltage is blocked by diode 21 and does not appear at terminal 23.

The voltage at input terminal 22 of gate 24 is biased positive by battery 42 through resistor 44. When the induced voltage causes the voltage at terminal 18 to go to zero, as shown at point 45, FIG. 4, the voltage at input terminal 22 also goes to zero. Positive-going pulses at terminal 18 are suppressed by diode 20.

Gates 24 and 25 are cross-connected by conductors 48 and 49 to provide a well known latching or flip-flop action. FIGURE 2 shows a truth table or polarity diagram for gate 25. Referring to FIG. 2, it is seen that when a zero potential is applied to either input 23 or input 27, the output terminal 29 goes plus. When both input terminals 23 and 27 are plus, the output 29 goes to zero. The action for gate 24 is the same as for gate 25.

When manual key 4 is operated, battery 10 reverses the polarity of the signal current from marking to spacing, and causes a zero going pulse to appear at terminal 19. This causes input terminal 23 of gate 25 to go to zero and switches the output termianl 29 to plus. Conductor 48 carries this plus to input terminal 26 of gate 24. Terminal 22 is also plus, due to bias battery 42. Output 28 therefore switches to zero.

Outgoing line conductors 33 and 32 extend from output terminals 29 and 28 and now carry spacing state line current from terminal 29 through the sounder magnet 5 to terminal 28, as shown in trace 47, FIG. 4.

When manual key 4 is restored to normal, battery 9 supplies marking current. The change from space to mark in the transformer primary winding 13 causes a zero pulse to appear at terminal 18 and at terminal 22. This switches output terminal 28 to plus, and subsequently through terminal 27 switches terminal 29 to zero. This reverses the current in the outgoing line 32, 33, restoring the state from space to mark and maintaining this state until the next switching action occurs.

It is quite readily apparent that battery 10 can be omitted so that the spacing state is zero current rather than reversed current. The nature of the induced voltage in the secondary winding 15 will be unchanged, except for a reduction in amplitude which can be compensated by doubling the amplitude of the marking current in the primary winding, or by other suitable means.

If a zero current level is desired for the spacing state in the outgoing circuit 3, this can be accomplished as shown in FIG. 3 wherein a normal non-polarized magnet 35 has its return conductor 34 connected to ground in the relay circuit.

When output terminal 28 of gate 24 is at plus potential, marking state line current will flow through magnet 35 to ground. When output terminal 28 is at zero potential, the line current will be zero, representing the spacing state.

Various input signal options are available since the transformer 14 reacts only to the change of state of the current in its primary winding 13 and not to the absolute current level. This characteristic also makes the relay insensitive to deviations in the absolute signal level.

During idle periods tongue 6 in key 4 remains in contact with contact point 7, maintaining positive or marking current on line 1. Under this condition terminal 28 is also positive, supplying marking current on line 3.

The spacing condition is always of relatively short duration, the signal condition invariably returning to marking after each character is transmitted, and usually returning during the transmission of a character.

If terminal 28 is fortuitously switched to zero during a transmission pause, the current in circuit 3 will be held in the spacing state until the next character is transmitted. To avoid this condition, which may be found undesirable under some conditions, an alternate bias circuit may be provided for gate 24, as shown in FIG. 5.

When terminal 28 switches to the marking state its polarity is plus. As shown in FIG. 5, this charges capacitor 50 through diode 51. When terminal 28 switches to zero potential, the charge slowly leaks off through resistor 52. The discharge time for capacitor 50 is longer than any proper spacing signal period, and terminal 22 therefore has a continuous plus bias.

Should terminal 28 remain at zero potential for a time period longer than the discharge time for condenser 50, the voltage at terminal 22 will approach zero, causing gate 24 to switch. Due to the latching action, gate 25 also switches and marking current is established for circuit 3.

I claim:

1. A line relay for a telegraph system of the kind comprising a first circuit through which direct current telegraph signal impulses of indeterminate duration having two states are transmitted and a second circuit through which corresponding direct current telegraph signal impulses are to be re-transmitted, said line relay comprising:

a transformer, having a primary winding electrically connected in said first circuit and a secondary winding electrically connected in said second circuit, for transferring electrical energy from said first circuit to said second circuit, said primary and secondary windings being electrically isolated from each other; and transmitting means in said second circuit for reproducing said direct current telegraph signal impulses of said two states therein in response to the electrical energy transferred between said circuits through said transformer, said transmitting means comprising a flip-flop circuit having two inputs, one input connected to each end of said secondary winding.

2. A line relay for a telegraph system according to claim 1 in which said secondary winding is provided with a center tap connected to a source of reference potential.

3. A line relay for a telegraph system according to claim 1 in which said flip-flop circuit comprises two NAND gates, each of said NAND gates having a first input connected to a respective end terminal of said secondary winding and a second input connected to the output of the other NAND gate to afford a flip-flop circuit comprising both gates.

4. A line relay for a telegraph system according to claim 3 in which the first input to each of said gates includes a bias signal source normally maintaining said first input at a given reference potential.

5. A line relay for a telegraph system according to claim 4 in which said bias signal source for one of said gates includes a time-delay circuit, responsive to the output of said gate, for actuating said gate in simulation of a received telegraph signal impulse whenever the output remains in a given state beyond a predetermined period of time.

References Cited

UNITED STATES PATENTS

| | | | |
|---|---|---|---|
| 3,210,570 | 10/1965 | Brock et al. | 307—236 |
| 3,233,119 | 2/1966 | Kruj | 307—236 |
| 3,417,298 | 12/1968 | Smith | 317—151 |

THOMAS A. ROBINSON, Primary Examiner

U.S. Cl. X.R.

178—68; 307—236; 317—150; 325—164; 328—118